United States Patent
Gungor et al.

(10) Patent No.: US 9,819,488 B2
(45) Date of Patent: Nov. 14, 2017

(54) GENERATION OF ENCRYPTION KEYS BASED ON LOCATION

(71) Applicant: Ohio State Innovation Foundation, Columbus, OH (US)

(72) Inventors: Onur Gungor, Columbus, OH (US); Can Emre Koksal, Worthington, OH (US)

(73) Assignee: Ohio State Innovation Foundation, Colbumbus, OH (US)

( * ) Notice: Subject to any disclaimer, the term of this patent is extended or adjusted under 35 U.S.C. 154(b) by 154 days.

(21) Appl. No.: 14/328,416

(22) Filed: Jul. 10, 2014

(65) Prior Publication Data
US 2016/0013941 A1   Jan. 14, 2016

(51) Int. Cl.
*H04L 29/06* (2006.01)
*H04L 9/08* (2006.01)

(52) U.S. Cl.
CPC .................. *H04L 9/0872* (2013.01)

(58) Field of Classification Search
USPC ........................................................ 380/44
See application file for complete search history.

(56) References Cited

U.S. PATENT DOCUMENTS

| | | | | |
|---|---|---|---|---|
| 6,633,905 B1 * | 10/2003 | Anderson | ................. | G06F 1/26 709/219 |
| 7,532,723 B2 * | 5/2009 | Chitrapu | ............... | H04L 9/3234 380/44 |
| 7,631,190 B2 * | 12/2009 | Walmsley | ................. | H04L 9/12 380/44 |
| 7,757,086 B2 * | 7/2010 | Walmsley | ............ | B41J 2/17546 380/259 |
| 8,301,891 B2 | 10/2012 | Fascenda | | |
| 8,320,562 B2 | 11/2012 | Hammond et al. | | |
| 8,515,061 B2 * | 8/2013 | Patwari | ................. | H04L 9/0838 375/343 |

(Continued)

FOREIGN PATENT DOCUMENTS

| | | |
|---|---|---|
| WO | 98/51032 | 11/1998 |
| WO | 2006/130725 | 12/2006 |
| WO | 2007/121178 | 10/2007 |

OTHER PUBLICATIONS

Lu, Wenjun; Varna, Avinash L.; Wu, Min. Confidentiality-Preserving Image Search: A Comparative Study Between Homomorphic Encryption and Distance-Preserving Randomization. IEEE Access, vol. 2. Pub. Date: 2014. http://ieeexplore.ieee.org/stamp/stamp.jsp?arnumber=6746001.*

(Continued)

*Primary Examiner* — Jeremiah Avery
(74) *Attorney, Agent, or Firm* — Michael Best & Friedich LLP

(57) ABSTRACT

A method of generating an encryption key including determining, by a processor, a distance between a first node and a second node, and generating, by the processor, a first encryption key based on the distance between the first node and the second node. The method also includes compressing, by the processor, the first encryption key to generate a compressed encryption key; and applying, by the processor, a universal hash function to the compressed encryption key to generate a second encryption key. The second encryption key is smaller than the first encryption key.

21 Claims, 5 Drawing Sheets

(56) References Cited

U.S. PATENT DOCUMENTS

| | | | | |
|---|---|---|---|---|
| 2004/0181303 | A1* | 9/2004 | Walmsley | B41J 2/04505 700/115 |
| 2005/0154892 | A1* | 7/2005 | Mihcak | G06T 1/005 713/176 |
| 2005/0195975 | A1* | 9/2005 | Kawakita | H04L 9/0822 380/30 |
| 2006/0139681 | A1* | 6/2006 | Walmsley | G06F 21/445 358/1.14 |
| 2006/0239503 | A1* | 10/2006 | Petrovic | H04L 9/002 382/100 |
| 2007/0033419 | A1* | 2/2007 | Kocher | G06F 21/10 713/193 |
| 2013/0182844 | A1* | 7/2013 | Nagai | H04L 63/068 380/259 |
| 2013/0301829 | A1* | 11/2013 | Kawamura | H04L 9/0816 380/44 |
| 2014/0372812 | A1* | 12/2014 | Lutkenhaus | H04L 9/0855 714/57 |

OTHER PUBLICATIONS

Finsterbusch, Michael; Richter, Chris; Rocha, Eduardo; Muller, Jean-Alexander; HanBgen, Klaus. A Survey of Payload-Based Traffic Classification Approaches. IEEE Communications Surveys & Tutorials, vol. 16, Issue: 2. Pub. Date: 2014. http://ieeexplore.ieee.org/stamp/stamp.jsp?arnumber=6644335.*

Mathur et al., "Radio-telepathy: Extracting a Secret Key from an Unauthenticated Wireless Channel," MobiCom '08, 2008, 12 pages.

Patwari et al., "High-Rate Uncorrelated Bit Extraction for Shared Secret Key Generation from Channel Measurements," IEEE Transactions on Mobile Computing, 2010, vol. 9, No. 1, pp. 17-30.

Jana et al., "On the Effectiveness of the Secret Key Extraction from Wireless Signal Strength in Real Environments," MobiCom '09, 2009, 12 pages.

Wilson et al., "Channel Identification: Secret Sharing Using Reciprocity in Ultrawideband Channels," IEEE Transactions on Information Forensics and Security, 2007, vol. 2, No. 3, 364-375.

Zhang et al., "Mobility Assisted Secret Key Generation Using Wireless Link Signatures," 2009, 9 pages.

Zhang et al., "Secure Localization and Authentication in Ultra-Wideband Sensor Networks," IEEE Journal on Selected Areas in Communications, 2006, vol. 24, No. 4, 829-835.

* cited by examiner

GENERATION OF ENCRYPTION KEYS BASED ON LOCATION

BACKGROUND

The present invention relates to establishing secure communications between two computing devices. This invention was made with government support under CNS-0831919 and CNS-1054738 awarded by the National Science Foundation-Division of Computer & Network Systems. The government has certain rights in the invention.

SUMMARY

Current state-of-the art methods for confidential information transmission are typically based on computational cryptography. There are two existing cryptographic approaches: public-key based approaches and private-key based approaches. Public key approaches do not require a common key between the entities or nodes communicating with each other (sometimes referred to as "legitimate nodes"). In a public-key system, security is based on the computationally infeasibility to solve a particular mathematical computation. However, this infeasibility is not yet proven mathematically and, with increased computational power at illegitimate nodes, may not be as secure as previously thought. Thus, it remains unknown whether novel algorithms may decipher public key methods.

Private key methods (e.g., symmetric encryption) have different advantages and shortcomings. Symmetric encryption is often used to communicate between two computing devices securely. For example, secret keys are used for symmetric encryption and decryption of messages sent over a public (e.g., insecure) communication channel or network, such as the Internet. Anyone with knowledge of the secret key can then encrypt and decrypt the messages sent over the public network. Therefore, secret key distribution for systems using symmetric encryption presents a problem. Namely, the security of the encryption depends on the security of the secret key. Ideally, distribution of secret keys is accomplished over a secure channel. However, a secure channel cannot be set up without the distribution of the secret keys.

As described below, a system is developed according to at least one embodiment of the invention, in which two computing devices determine a distance between each other and use the measured distance to generate a secret encryption key independently of each other. Since the actual distance is the same regardless of whether the distance is measured from the first computing device or from the second computing device, the secret encryption key, although generated independently, is substantially the same at both computing devices.

In one embodiment, the invention provides a method of generating an encryption key. The method includes determining, by a processor, a distance between a first node and a second node, and generating, by the processor, a first encryption key based on the distance between the first node and the second node. The method also includes compressing, by the processor, the first encryption key to generate a compressed encryption key; and applying, by the processor, a universal hash function to the compressed encryption key to generate a second encryption key. The second encryption key is smaller than the first encryption key.

In another embodiment the invention provides a system used in generation of encryption keys. The system includes a first node including a first processor configured to determine a distance between the first node and a second node, and generate a first encryption key based on the distance between the first node and the second node. The first processor is also configured to compress the first encryption key to generate a compressed first encryption key, and generate a second encryption key based on the compressed first encryption key. The second encryption key is smaller than the first encryption key. The system also includes a second node including a second processor configured to determine a distance between the second node and the first node, and generate a third encryption key based on the distance between the second node and the first node. The second processor is also configured to compress the third encryption key to generate a compressed third encryption key, and generate a fourth encryption key based on the compressed third encryption key. The fourth encryption key is smaller than the third encryption key, and the fourth encryption key is substantially the same as the second encryption key.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
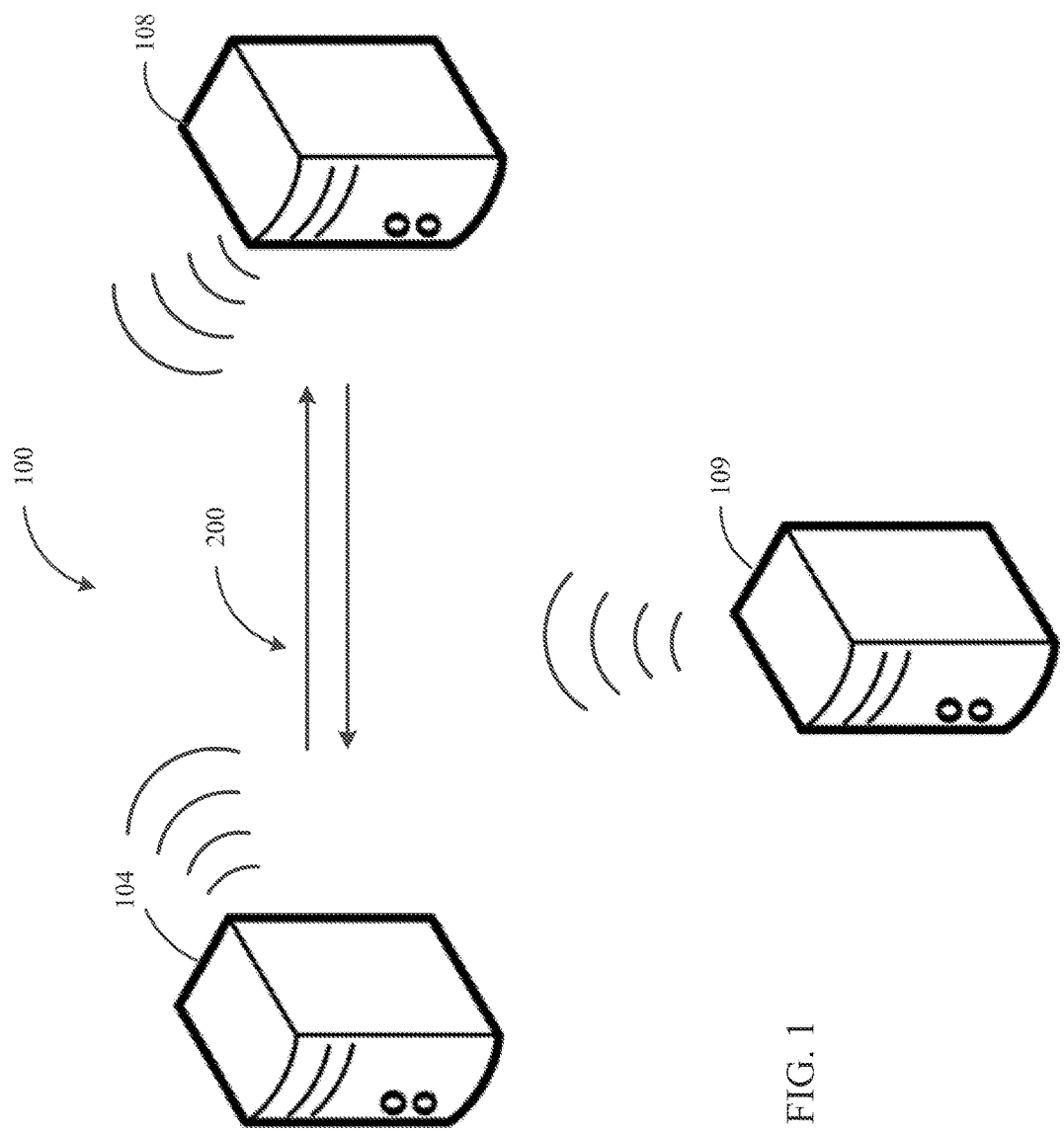
FIG. 1 illustrates a communication system according to one embodiment of the invention.

FIG. 1 illustrates a communication system 100 including a first computing device 104, a second computing device 108, and a third computing device 109. Each computing device 104, 108, and 109, may also be referred to as a node. For example, the first computing device 104 may correspond to a first node, the second computing device 108 may correspond to a second node, and the third computing device 109 may correspond to a third node. The communication system 100 also includes a public channel over which the computing devices 104, 108, and 109 may broadcast information to each other and the computing devices 104, 108, and 109 may have access to information not directly shared. For example, when the first computing device 104 and the second computing device 108 communicate via the public channel, the third computing device 109 may have access to the information communicated between the first computing device 104 and the second computing device 108, even though the information was not directly communicated to the third computing device 109.

The computing devices 104, 108, and 109 may also communicate via a secured channel 200. The secured channel 200 is established by using secret encryption keys for encryption and decryption of messages between legitimate nodes (e.g., nodes that have access to the secret encryption keys and can therefore, encrypt and decrypt messages). In the illustrated example, the legitimate nodes are represented by the first computing device 104 and the second computing device 108. The first computing device 104 communicates with the second computing device 108 over the secured channel 200 using secret encryption keys generated by the first computing device 104 and the second computing device 108. The third computing device 109, however, is not part of the secured communication between the first computing device 104 and the second computing device 108, but attempts to obtain information regarding the secret encryption keys and the communication (e.g., messages) between the first computing device 104 and the second computing device 108. In other words, in the illustrated example, the third computing device 109 represents an eavesdropper attempting to break the security of the secured channel 200 (e.g., by uncovering the secret keys used by the legitimate nodes 104 and 108). In the description that follows, the first computing device 104 may also be referred to as the first node 1, the second computing device 108 may be referred to as the second node 2, and the third computing device 109 may be referred to as the eavesdropper node e.

To prevent the third computing device 109 from obtaining meaningful information regarding the secret encryption keys used by the first computing device 104 and the second computing device 108, the computing communication system 100 is configured such that the first computing device 104 and the second computing device 108 generate secret encryption keys that are random, reliable, and remain secret even when the third computing device 109 obtains some information regarding the secret encryption keys. The first computing device 104 and the second computing device 108 determine a distance between the first computing device 104 and the second computing device 108, and use the determined distance to generate secret encryption keys using information reconciliation, key compression, and privacy amplification. Therefore, the secret encryption keys are secret, reliable, and random such that an eavesdropper (e.g., the third computing device 109) does not determine the secret encryption key.

Using distance information between the first computing device 104 and the second computing device 108 is advantageous, at least because distance reciprocity is robust regardless of the environment in which the computing devices 104, 108, and 109 are situated. Distance reciprocity is robust because the distance measured between any pair of nodes (e.g., computing devices) is identical, regardless of where the distance measurement originates (e.g., in the first computing device 104 or the second computing device 108). Furthermore, the time scale of location variations is much smaller than the time it takes to make distance and location observations. In other words, the location of the legitimate nodes (e.g., the first computing device 104 and the second computing device 108) changes slowly. Consequently, it may be easier to obtain fully reciprocal distance observations, even in highly mobile environments. Indeed, two nodes are in a much better position to measure their relative location (e.g., the distance between them), compared to other nodes (e.g., third computing device 109).

Figure 2:
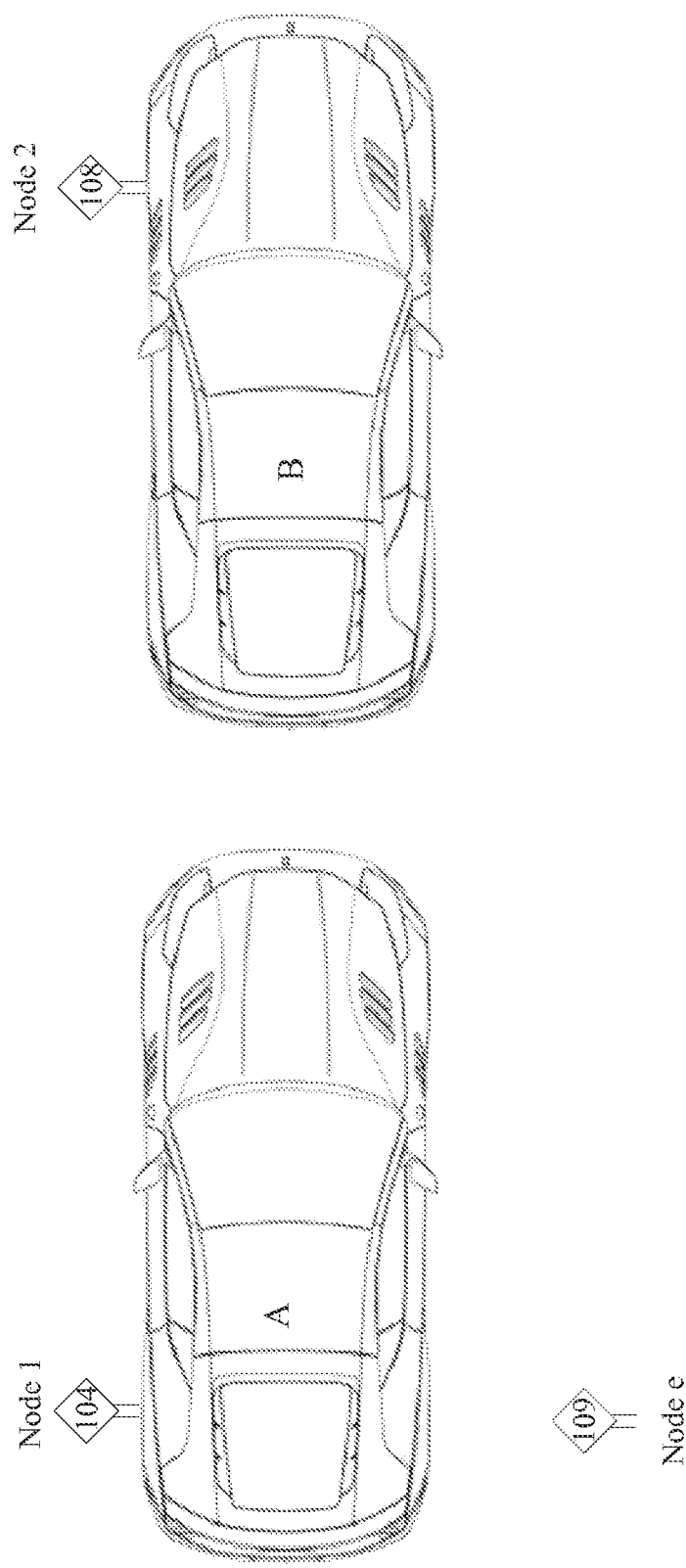
FIG. 2 illustrates an intelligent transportation system including the communication system shown in FIG. 1.

Such a communication system 100 may have different applications. For example, the communication system 100 may be used in an intelligent transportation system 500, as shown in FIG. 2. As shown in the illustrated example, the first vehicle 504a includes the first computing device 104 and the second vehicle 504b includes the second computing device 108. The third computing device 109 is situated near the first and second computing devices 104, 108. For example, the third computing device 109 may be situated in a separate vehicle or may simply be on the side of a highway. In the intelligent transportation system 500, vehicles 504a and 504b rely on each other to signal the events (for example, a vehicle crash or other emergency event) that occur in the transportation system 500. The vehicles 504a and 504b communicate with each other using the first computing device 104 and the second computing device 108. For example, an abrupt stop on a highway can be relayed from the second computing device 108 to the first computing device 104 to avoid collisions involving multiple vehicles 504a and 504b. Therefore, the first vehicle 504a verifies the authenticity of an incoming signal to ensure that the incoming signal is legitimate (i.e., from the second vehicle 504b), rather than being initiated by an attacker (e.g., the third computing device 109) with an intention of causing chaos. To verify authenticity, each vehicle 504a and 504b generates a private key. The private key generated by each vehicle 504b can be generated in a pair with a second vehicle 504a, or with certification points along the highway. Each signal (in the case of an accident or similar event, an emergency signal) can then be accompanied with the private key of the associated vehicle 504b to verify the authenticity of the signal, as well as provide identification for the vehicle 504b that generated the signal.

The communication system 100 may also be included in tactical networks used, for example, in military units. For example, in a battle scenario, groups of soldiers and vehicles remain mobile for extended amounts of time as they approach their target. The local randomness within the group as it approaches its destination can be used to generate a secret key, which can be used subsequently during a military action to, for example, communicate new destination coordinates.

Given the plethora of applications available for the communication system 100, the computing devices 104, 108, and 109 as described below are not limited to specific applications, and the communication system 100 may be established when one, two, or all nodes 104, 108, and 109 are highly mobile. In other words, the communication system 100 and the generation of the secret keys as described below does not assume that one of the computing device 104, 108, and 109 is not mobile. Therefore, the computing devices 104, 108, and 109 may be computers, laptop computers, mobile phones, smartphones, tablet computers, a general microprocessor, and the like. Furthermore, the computing devices 104, 108, and 109 are representative of legitimate nodes (i.e., computing devices 104 and 108) and illegitimate nodes (i.e., computing device 109). Some applications may include more than two legitimate devices and/or more than one illegitimate device.

In the communication system 100, one of the legitimate computing devices 104 and 108 is assigned as master node or master device. In the illustrated embodiment, the first computing device 104 acts as the master node. Note that in other examples or embodiments, the second computing device 108 may act as the master node. Selection of the master node may depend on, for example, processing power of each of the computing devices 104 and 108, or may depend based on the specific structure of the communication system 100. For example, if the communication system 100 includes three legitimate devices (e.g., Alice, Bob, and Casey), and two of the legitimate devices (e.g., Bob and Casey) need to communicate with the other legitimate device (e.g., Alice), then the third legitimate device (e.g., Alice) may be assigned as the master node. The master node or device 104 initiates communication with the second computing device 108. The second computing device 108 merely responds to the communication from the first computing device 104. The master computing device 104 also selects values for specific parameters used in the generation of secret encryption keys and communicates the values of the parameters to the second computing device 108.

Figure 3:
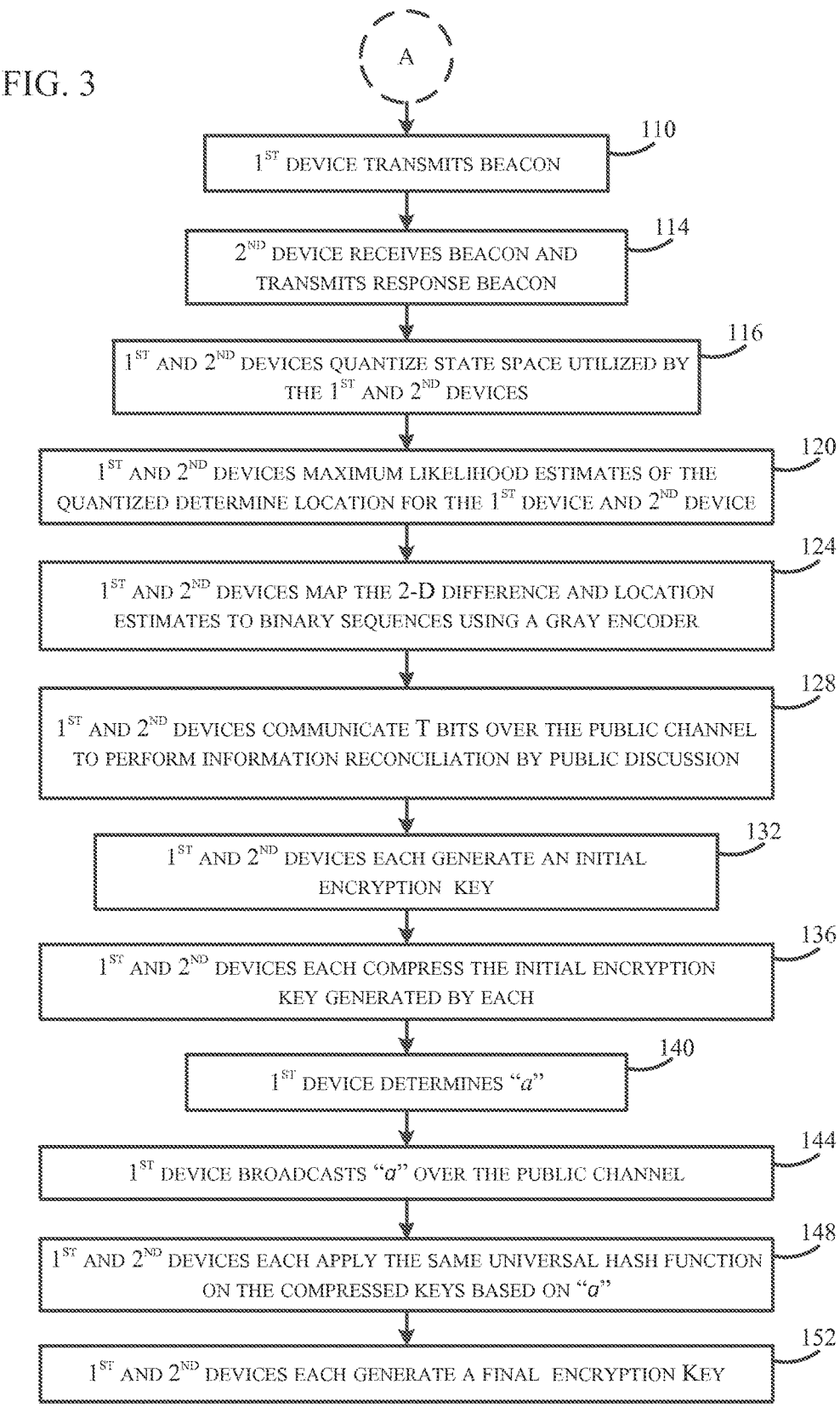
FIG. 3 is a flowchart illustrating a method of generating secret encryption keys.

FIG. 3 illustrates a method used by the communication system 100 to generate secret encryption keys. To begin the process of generating a secret encryption key, the first computing device 104 (e.g., the master node) broadcasts (e.g., transmits) a beacon over the public channel to the second computing device 108 (step 110). When the second computing device 108 receives the beacon from the first computing device 104, the second computing device 108 then transmits a response beacon to the first computing device 104 (step 114). In the illustrated embodiment, the first computing device 104 and the second computing device 108 exchange beacons and response beacons for a specified period of time (e.g., for approximately 5 seconds). In other embodiments, the first computing device 104 and the second computing device 108 exchange beacons and response beacons a predetermined number of times (e.g., 5 beacon exchanges). The first computing device 104 and the second computing device 108 are able to obtain approximations of the distance between the first computing device 104 and the second computing device 108 based on the beacon and response beacon transmissions.

In the illustrated embodiment, the first computing device 104 and the second computing device 108 obtain distance measurements actively through exchange of wireless radio beacons. In other embodiments, the distance measurements may be obtained actively through the exchange of ultrasound or infrared beacons. While in yet other embodiments, the distance measurements may be obtained passively by processing existing video images, and the like. The beacon signals exchanged by the first computing device 104 and the second computing device 108 may include explicit information such as a time stamp, an identification of the computing device 104, 108, and the like. The receiving computing device 104, 108 can, additionally or alternatively, extract other location information from the beacon and the response beacon, such as angle of arrival, received signal strength, and the like.

Figure 4:
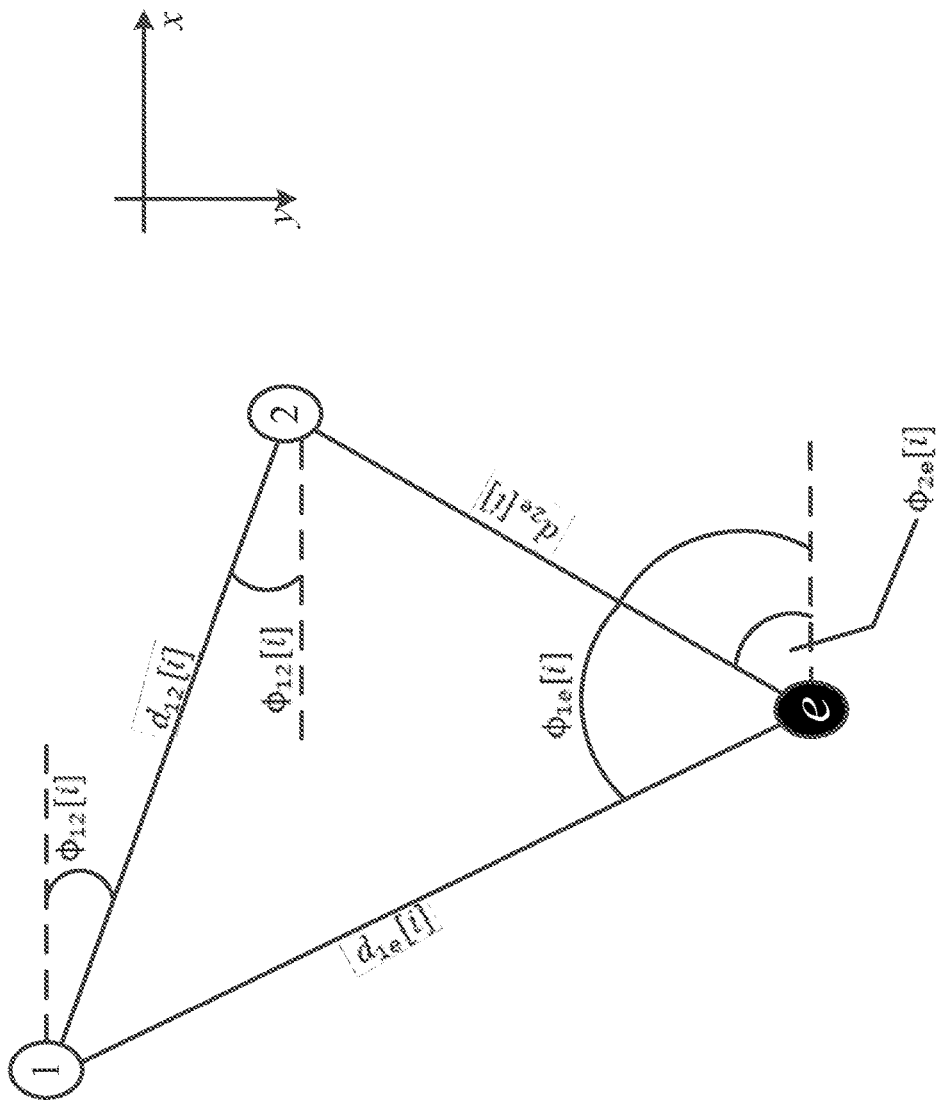
FIG. 4 is a schematic diagram of the location observations related to a first computing device, a second computing device, and a third computing device of the communication system shown in FIG. 1.

As explained above, the first computing device 104 and the second computing device 108 may exchange beacon signals for a predetermined amount of time or for a predetermined number of exchanges. Therefore, the time during which the first computing device 104 and the second computing device 108 exchange beacon signals is divided into n discrete slots and the space occupied by the first computing device 104 and the second computing device 108 is denoted as field $\mathbb{R}^2$. In the text that follows, when using equations to describe a process or a state, the first computing device 104 is equivalent to node 1, the second computing device 108 is equivalent to node 2, and the third computing device 109 is equivalent to node e (e.g., the eavesdropper). Then, $l_j[i] \in \mathcal{L}$ is the random variable that denotes the coordinates of the location of node $j \in \{1, 2, e\}$ in slot $i \in \{1, \ldots, n\}$, where nodes are restricted to the field $\mathcal{L} \subset \mathbb{R}^2$. The boldface notation $l_j = \{l_j[i]\}_{i=1}^n$, to denote the n-tuple location vectors for $j \in \{1, 2, e\}$. The distance between the first computing device 104 and the second computing device 108 in slot i is $d_{1,2}[i] = \|l_1[i] - l_2[i]\|$. Similarly, $d_{1,e}[i]$ and $d_{2,e}[i]$ denote the sequence of distances between the first computing device 104 and the third computing device 109, and the second computing device 108 and the third computing device 109, respectively. The boldface notation $\mathbf{d}_{1,2}, \mathbf{d}_{1,e}, \mathbf{d}_{2,e}$ denotes the n-tuple distance vectors. Note that, in any slot i the computing devices 104, 108, and 109 form a triangle in $\mathbb{R}^2$, as depicted in FIG. 4, where $\phi_{1,2}[i]$, $\phi_{2,1}[i]$, $\phi_{1,e}[i]$, $\phi_{2,e}[i]$ denote the angles with respect to a coordinate axis x, y. The distances $d_{1,2}[i], d_{1,e}[i], d_{2,e}[i]$ are assumed to take values in the interval $[d_{min}, d_{max}]$, since the computing devices 104, 108, and 109 cannot be closer to each other than $d_{min}$ due to physical restrictions. The computing devices 104, 108, and 109 cannot be further than $d_{max}$ from each other because each computing device 104, 108, and 109 includes a limited communication range. Therefore, the location vectors $l_1, l_2, l_e$ may be ergodic processes for which mean and variance can be deduced from a single, but sufficiently long sample. The notation $s \triangleq [l_1, l_2, l_e]$ is then used to summarize the state variables related to mobility in the communication system 100. Note that $s[i] \in \mathcal{L}^3 = \mathcal{L} \times \mathcal{L} \times \mathcal{L}$ for any i.

At each time slot i, there is a period in which the legitimate computing devices 104, 108 obtain information about the relative position of the computing devices 104, 108 with respect to each other. As discussed earlier, various method to establish the localization information exist (e.g., exchanging ultrasound, infrared, Lidar, Radar, wireless radio signals, and the like). During the time slot i, when the first computing device 104 transmits a beacon, the second computing device 108 and the third computing device 109 each obtain a noisy observation of $d_{1,2}[i]$ and $d_{1,e}[i]$ respectively. These observation are denoted $\hat{d}_2[i]$ and $\hat{d}_{1,e}[i]$, respectively. Similarly, when the second computing device 108 transmits a response beacon, the first computing device 104 and the third computing device 109 obtain the distance observations $\hat{d}_1[i]$ and $\hat{d}_{2,e}[i]$, respectively. The computing devices 104, 108, and 109 may also independently observe their global positions, for example, through a GPS device. In some embodiments, the computing devices 104 and 108 are equipped with direction sensitive localizers (e.g., directional antennas in wireless localization) and may also observe the angle between each other.

In other embodiments, no global location information is available. In such embodiments, the computing devices 104 and 108 do not have any knowledge of their global location. Therefore, the computing devices 104 and 108 determine their respective location based on the observations made from the beacon and response beacon exchanges. However, because the third computing device 109 (e.g., the eavesdropper) obtains both $\hat{d}_{1,e}[i]$ and $\hat{d}_{2,e}[i]$, the third computing device 109 can derive a noisy observation, $\hat{\phi}_e[i]$, of the angle between the first computing device 104 and the second computing device 108 (e.g., the legitimate nodes) relative to the third computing device 109. When global locations are not available at the computing devices 104 and 108, the first computing device 104 is assumed to be at the origin. In other words, $l_1[i] = [0\ 0]$ for all i.

However, if global location information is available, each computing device 104, 108, and 108 knows its global location, and a sense of orientation with respect to some coordinate plane as shown in FIG. 4. In such embodiments, the first computing device 104 and the second computing device 108 obtain noisy location observations $\hat{\phi}_1, \hat{\phi}_2$ of the angle $\phi_{1,2}$. Similarly, the third node 109 obtains noisy observation $\hat{\phi}_{1,e}, \hat{\phi}_{2,e}$ of the angles $\phi_{1,e}, \phi_{2,e}$.

The observations obtained from each of the computing devices 104, 108, and 109 in each slot i are obtained solely from the beacons and response beacons exchanged during that particular slot i. Due to predictable mobility patterns, the final estimation of a distance between one of the computing devices 104, 108, and 109 (e.g., the first computing device 104) and another one of the computing devices 104, 108, and 109 (e.g., the second computing device 108) may also be based on the observations during other time slots i. In other words, if the first computing device 104 has some knowledge regarding the predictable mobility pattern of the second computing device 108, the final estimation of distance between the first computing device 104 and the second computing device 108 may be based on observations obtained during several time slots i.

Referring back to FIG. 3, the space (e.g., field) $\mathcal{L}$ occupied by the first computing device 104 and the second computing device 108 is quantized (step 116). Quantization allows the computing devices 104, 108, 109 to efficiently calculate the location estimates and store the quantized space coordinates for use in subsequent steps. In the illustrated embodiment, uniform two-dimensional quantization function $\psi$ is considered, which is $$\psi(l, \Delta) \triangleq \underset{k:\ k=\frac{u\Delta}{\sqrt{2}}, u\in\mathbb{Z}^2}{\arg\min} \|k-l\|$$

where $\Delta \triangleq \max_x |x-\psi(x)|$ is the resolution of quantization. Hence, the quantized field is denoted as $\mathcal{L}^\Delta = \{\psi(l, \Delta)\}_{l\in\mathcal{L}}$, and the quantized states are denoted as $s^\Delta \triangleq [l_1^\Delta, l_2^\Delta, l_e^\Delta]$ where $s^\Delta \in S^\Delta = (\mathcal{L}^\Delta)^3$.

Once the field has been quantized, the computing devices 104, 108, 109 determine the maximum likelihood estimates for the location (e.g., the quantized space coordinates) of each legitimate node 104, 108 (step 120). In the case where mobility statistics (e.g., mobility patterns) are available at the computing devices 104, 108, and 109, each computing device 104, 108, and 109 finds the maximum likelihood estimates for each of the computing devices 104, 108, and 109 based on observations from more than one time slot i. In other words, each computing device 104, 108, and 109 finds the maximum likelihood estimate $\tilde{s}_1^\Delta$ and $\tilde{s}_2^\Delta$ of the quantized location triple $s^\Delta = [l_1^\Delta, l_2^\Delta, l_e^\Delta]$, where $$\tilde{s}_j^\Delta \triangleq \arg\max_{s^\Delta \in S^\Delta} \mathbb{P}(s^\Delta | o_j), j \in \{1,2\}$$

Note that, $\tilde{s}_j^\Delta = [\tilde{l}_{1,j}^\Delta, \tilde{l}_{2,j}^\Delta, \tilde{l}_{e,j}^\Delta]$ where $\tilde{l}_{1,j}^\Delta$ is node j's maximum likelihood estimate of the location vector for the first computing device 104. In the illustrated embodiment, the terms $\tilde{s}_j^\Delta$ are obtained efficiently by using the Viterbi algorithm. In general, the Viterbi algorithm finds the location coordinates with the highest probability of locating the computing device 104, 108, and 109. Note that for very small A, it may not be computationally feasible to run the Viterbi algorithm, since quantized state size $|S^\Delta|$ approaches infinity as $\Delta$ approaches zero. If, on the other hand, mobility statistics are not available at the computing devices 104, 108, and 109, then the maximum likelihood estimates of the locations of the computing devices 104, 108, and 109 at a given slot i depend solely on the observations on the particular slot i and the Viterbi algorithm is not performed.

For embodiments in which the computing devices 104, 108, and 109 do not have access to mobility statistics for the other computing devices 104, 108, and 109 and global location information is available, the quantized location triple is found using the following equation instead of the one above:

$$\tilde{l}_{2,1}^\Delta[i] = l_1^\Delta[i] + \hat{d}_1[i]\angle\phi_1[i], \tilde{l}_{1,2}^\Delta[i] = l_2^\Delta[i] + \hat{d}_2[i]\angle\phi_2[i]$$

Note that when perfect global location information is available, each computing device 104, 108, 109 knows its global location: $l_j^\Delta[i] = l_{j,j}^\Delta[i]$, for $j \in \{1, 2\}$.

In some embodiments, however, global location information is not available. Therefore, angle and global location observations are not available at the legitimate nodes (e.g., computing devices 104, 108). Hence, the computing devices 104, 108, 109 do not have any useful information about each other's 2-D location. In such embodiments, the computing devices 104, 108, and 109 only use their 1-D distance observations in the following public discussion stage, instead of their two-dimensional location estimates, i.e., we set $\tilde{s}_1^\Delta = \hat{d}_1$ and $\tilde{s}_2^\Delta = \hat{d}_2$.

Referring back to FIG. 3, the computing devices 104 and 108 then each proceed to generate digital sequences (e.g., binary, hexadecimal, ASCII sequences, and the like) based on the quantized space coordinates for the first node 104 and the second node 108. In the illustrated embodiment, the computing devices 104 and 108 each generate a first binary sequence and a second binary sequence, respectively, using a gray encoder (step 124). First, each node $j \in \{1, 2\}$ obtains an initial m bit binary sequence $$v_j[i] = \kappa(\tilde{l}_{1,j}^\Delta[i] - \tilde{l}_{2,j}^\Delta[i], m),$$

where $\kappa(\cdot, m) \triangleq (\mathcal{L}^\Delta - \mathcal{L}^\Delta) \to \{1 \ldots 2^m\}$ is a Gray encoder, which maps the 2-D difference of location estimates to m bit binary sequences. In other words, $v_j = [v_j[1] \ldots v_j[n]]$ represents a concatenated version of bit sequences, of size nm bits.

Because the observations include some noise, the first binary sequence $v_1$ and the second binary sequence $v_2$ may not match exactly. Based on the amount of noise within the observations, the bit mismatch rate, BMR, (e.g., the difference) between the first binary sequence $v_1$ and the second binary sequence $v_2$, denoted $BMR(v_1, v_2)$ may be significant. Therefore, the first computing device 104 and the second computing device 108 communicate T bits (e.g., T binary messages) $(C_1[1], \ldots, C_1[T])$ and $(C_2[1], \ldots, C_2[T])$ over the public channel to perform information reconciliation (e.g., to match or reconcile the first binary sequence $v_1$ with the second binary sequence $v_2$) by public discussion (step 128). By exchanging T binary messages, the first computing device 104 and the second computing device 108 agree on almost identical binary sequences $v_1$, $v_2$. The first computing device 104 and the second computing device 108 then each generate nearly identical initial keys $u_1$ and $u_2$ (step 132), respectively, such that $$BMR(v_1, v_2) < \delta,$$

where $\delta > 0$ can be chosen low enough such that the reliability constraint for the specific application is satisfied. In the illustrated embodiment, Cascade reconciliation protocol is used to perform information reconciliation. The Cascade protocol performs efficiently when the BMR of the initial sequences is low enough such that $$BMR(v_1, v_2) < 0.15,$$

Parameter m is chosen as large as possible such that Equation (10) is satisfied. On the other hand, T is variable, and depends on bit sequences, intermediate Cascade parameters, and the bit mismatch rate between the first binary sequence $v_1$ and the second binary sequence $v_2$.

Due to predictable mobility patterns of the first computing device 104 and the second computing device 108 (e.g., the legitimate nodes), $v_j$, hence $u_j$, may not be perfectly random. Furthermore, the third computing device 109 (e.g., the eavesdropper) may obtain information correlated with $u_j$ due to two reasons: The eavesdropper's observations $o_e$ are correlated with the legitimate nodes' observations $o_1$, $o_2$, and the parity bits T exchanged during the cascade protocol (e.g., the information reconciliation process) via the public channel reveal some information about the initial keys $u_1$, $u_2$ to the eavesdropper. Therefore, to generate secret and random encryption keys, the first computing device 104 and the second computing device 108 each compress (step 136) and hash (step 148) the initial keys $u_1$, $u_2$. By compressing and applying a hash function to the initial keys $u_1$, $u_2$, the first computing device 104 and the second computing device 108 obtain smaller keys that are random and secret. In addition, the third computing device 109 obtains little to no information about the keys.

Thus, the first computing device 104 and the second computing device 108 compress the initial keys $u_1$, $u_2$ using a universal compression function $H_c(\cdot)$ to obtain $$q_j = H_c(u_j), j \in \{1,2\}$$

where the binary sequences (e.g., the compressed encryption keys) $q_j$ are of size nR' bits. In the illustrated embodiment, the Deflate/Inflate compression library for function $H_c(\cdot)$ is used. The compression ratio can then be denoted by $\alpha \triangleq$ $$\frac{R'}{m}.$$

Once the initial keys $u_1$, $u_2$ are compressed, the first computing device 104 and the second computing device 108 apply a universal hash function to the compressed keys $q_1$, $q_2$ to obtain the final encryption keys, which are shorter secret encryption keys $k_1$, $k_2$ (step 148). The following universal hash function is used to perform privacy amplification:

$$H_a(x) = LSB_{nR}(a \cdot x)$$

where $LSB_{nR}$ is the least significant nR bits, a is an element over the binary Galois field $GF(2^{nR'})$, and $x \in \{0, 1\}^{nR'}$ is interpreted as an element of the Galois field $GF(2^{nR'})$, with respect to a fixed basis of the extension field over the prime field GF (2). Consequently, $\{H_a(x)\}_{a \in GF(2^{nR'})}$ is a universal class of hash functions. In some embodiments, the universal hash function used to determine the final encryption keys $k_1$, $k_2$, is broadcasted over the public channel to the second computing device 108. In other embodiments, an appropriate hash function is predetermined and preprogrammed into the computing devices 104, 108, and 109 during a manufacturing or initialization process.

Before the first computing device 104 and the second computing device 108 apply the universal hash function as denoted above, the first computing device 104 acting as the master node, determines the parameter a to be used in the universal hash function (step 140). The first computing device 104 determines a randomly and uniformly over $GF(2^{nR'})$. The first computing device 104 then broadcasts a over the public channel so that the second computing device 108 can use the determined value of a to apply the universal hash function to the compressed key $q_2$ (step 144).

Both the first computing device 104 and the second computing device 108 proceed to apply the universal hash function based on the compressed keys $q_1$, $q_2$, the parameter a, and the number of bits T exchanged during the information reconciliation process (step 148). The first computing device 104 and the second computing device 108 then generate the final encryption keys $k_1$, $k_2$ (step 152). Therefore, the final secret encryption keys $k_1$, $k_2$ are denoted as:

$$k_1 = H_a(q_1, nR)$$

$$k_2 = H^a(q_2, nR)$$

Due to the imperfections associated with quantization and cascade reconciliation protocol, rate R often cannot be chosen to be the theoretical secret key capacity. Therefore, to maintain the final encryption keys as secret as possible, the rate R is chosen as R<R*, where R* is the equivocation rate at the third computing device 109 and is denoted as:

$$R^* = \frac{1}{n} H(q_1 \mid o_e, \{C_1[t], C_2[t]\}_{t=1}^T)$$

However, calculation of R* as denoted above may be computationally infeasible. Therefore, in the illustrated embodiment, R* is approximated as:

$$\tilde{R}^* = \alpha \left[ -BMR_e \log(BMR_e) - \left(1 - BMR_e \log(BMR_e) - \frac{T}{n}\right) \right]$$

which is much easier to evaluate.

$$BMR_e = \frac{\sum_{i=1}^{nm} 1(v_1[i] \neq v_e[i])}{nm}$$

corresponds to the bit mismatch rate at the third computing device 109 before public discussion or communication, assuming the third computing device 109 follows quantization and localization steps as described for the first computing device 104, and the second computing device 108, and obtains initial bit sequence $v_e$.

Note that, $BMR_e$ may not be perfectly available at the first computing device 104 or the second computing device 108, since $BMR_e$ requires perfect knowledge of $v_e$. However, when the mobility and observation noise statistics of the eavesdropper (e.g., the third computing device 109) are available at the first computing device 104, $BMR_e$ can be approximated using Monte Carlo simulations. Such an assumption is reasonable, as security is generally defined with respect to a certain threat model. Therefore, even if the exact mobility statistics of the third computing device 109 are unknown to the first computing device 104 and/or the second computing device 108, but the first computing device 104 and/or the second computing device 108 only know the set of mobility/observation noise statistics that the third computing device 109 (e.g., the eavesdropper) belongs to, the approximation using $BMR_e$ is reasonable. For example, the legitimate nodes 104, 108 can consider a variety of a class of attackers (e.g., third computing devices) with distinct mobility patterns. Then, the first computing device 104 and/or the second computing device 108 can determine $\tilde{R}^*$ to secure the secret keys $k_1$, $k_2$ with respect to the worst possible attacker.

As mentioned above, the third computing device 109 (e.g., the eavesdropper) may be of different types and/or associated with different classes of attackers. For example, the third computing device 109 may be a passive eavesdropper, which does not transmit any beacons to either the first computing device 104 or the second computing device 108. In such embodiments, the third computing device 109 simply makes observations of the relative locations of the first computing device 104 and the second computing device 108, and attempts to generate the final encryption key based on the observed locations. In other embodiments, the third computing device 109 may act as an active eavesdropper, which may transmit wireless messages and/or alter the messages between the first computing device 104 and the second computing device 108, and degrade or even change the communication between the first computing device 104 and the second computing device 108.

When the third computing device 109 acts as a passive eavesdropper, the third computing device 109 tries to determine the distance between the first computing device 104 and the second computing device 108 to generate the final secret keys $k_1$, $k_2$. The third computing device 109, however, attempts to determine the distance between the first computing device 104 and the second computing device 108 based on the distance observation between the first computing device 104 and the third computing device 109 and on the distance observation from the second computing device 108 and the third computing device 109. Each distance observation includes a certain amount of noise depending on, for example, how far the computing devices 104, 108, and 109 are from each other. Since the third computing device 109 requires more location observations to determine the distance between the first computing device 104 and the second computing device 108, the distances determined by the first computing device 104 and the second computing device are more accurate and less noisy than the distance determined by the third computing device 109. Therefore, due to the noise and inaccuracy of the distance estimate of the third computing device 109, the third computing device 109 does not generate an encryption key that matches the same final encryption keys $k_1$, $k_2$.

It is possible, however, that the third computing device 109 may change location and obtain a geographical advantage against the legitimate nodes (i.e., the first computing device 104 and the second computing device 108) even if the third computing device 109 may determine a less accurate distance between the first computing device 104 and the second computing device 108. For example, the third computing device 109 may move randomly, without a regard to the location of the first computing device 104 and the second computing device 108. Such random movement may, at times, give a geographical advantage to the third computing device 109. For example, while the third computing device 109 is randomly moving, the third computing device 109 may be positioned between the first computing device 104 and the second computing device 108. When the third computing device 109 is between the first computing device 104 and the second computing device 108, the mere presence of the third computing device 109 may degrade the communication between the first computing device 104 and the second computing device 108. In fact, while the third computing device 109 is between the first computing device 104 and the second computing device 108, the third computing device 109 is able to obtain better location observations regarding the location of the first computing device 104 and the second computing device 108 than either of the legitimate devices 104, 108.

In other embodiments, the third computing device 109 may move strategically and may attempt to obtain a geographic advantage compared to the legitimate nodes 104 and 108. Again, the third computing device 109 may control its movement to position itself between the first computing device 104 and the second computing device 108. For example, the third computing device 109 first determines the maximum likelihood estimates for the location of the first computing device 104 and the second computing device 108. The third computing device 109 then moves to the mid-point of the determined maximum likelihood estimates for the locations. Each time the third computing device 109 determines the maximum likelihood estimates for the locations of the legitimate computing devices 104 and 108, the third computing device 109 moves toward the mid-point of the determined maximum likelihood estimates. Therefore, the third computing device 109 obtains better maximum likelihood estimates for the locations as the number of times that the third computing device 109 moves increases.

Figure 5:
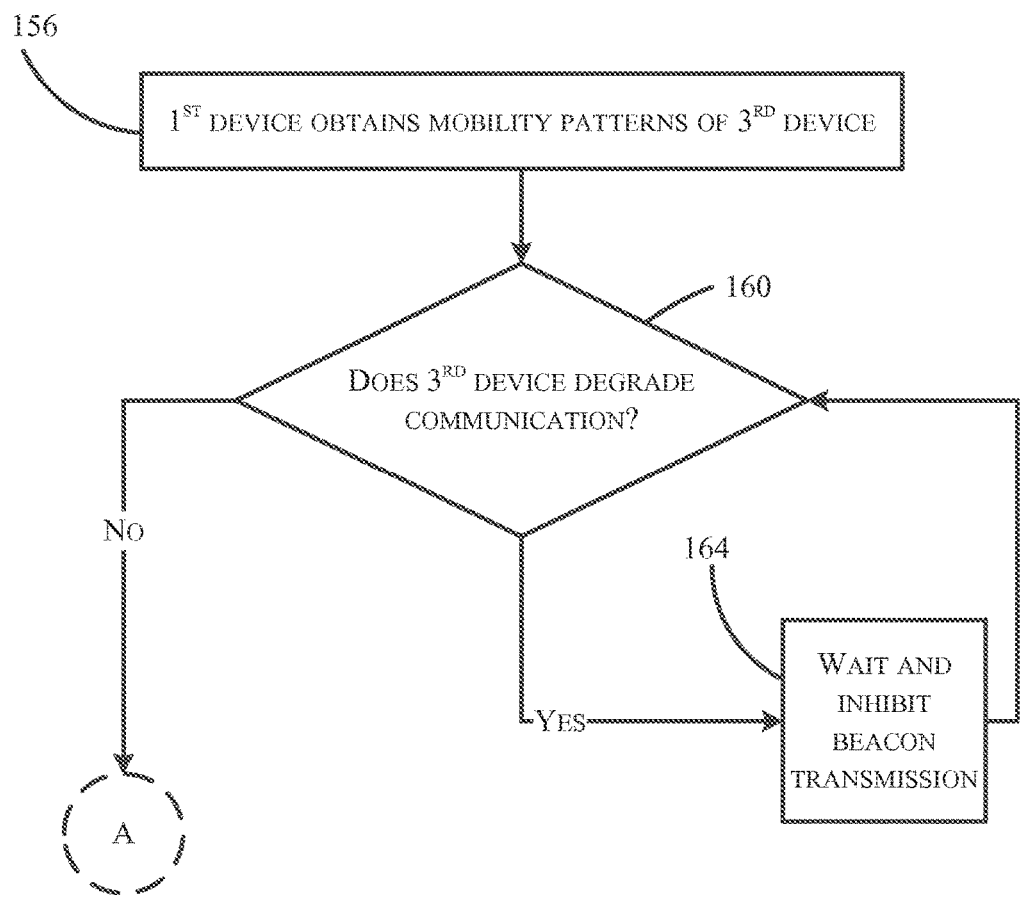
FIG. 5 is a flowchart illustrating a method of inhibiting beacon exchanges between the first computing device and the second computing device.

As shown in FIG. 5, the first computing device 104 inhibits beacon exchanges to the second computing device 108 to counteract and diminish the impact of a moving eavesdropper (i.e., moving third computing device 109). The first computing device 104 gains access to mobility statistics or patterns and observation noise statistics for the first computing device 104, the second computing device 108, and the third computing device 109 (step 156). The first computing device 104 then uses the mobility patterns and the observation noise statistics to determine when to inhibit beacon exchanges when the first computing device 104. For example, based on the mobility patters and the noise statistics, the first computing device 104 determines if the third computing device 109 degrades the communication between the first computing device 104 and the second computing device 108 (step 160). If the first computing device 104 determines that the third computing device 109 degrades the communication between the first computing device 104 and the second computing device 108, the first computing device 104 inhibits beacon exchanges between the first computing device 104 and the second computing device 108 (step 164). If, on the other hand, the first computing device 104 does not determine that the third computing device 109 degrades the communication between the first computing device 104 and the second computing device 108, the beacon exchanges continue between the first computing device 104 and the second computing device 108, as shown in steps 110 and 114 of FIG. 3.

In some embodiments, the third computing device 109 may be part of a bigger group of eavesdroppers. For example, the third computing device 109 may be part of a group of non-colluding eavesdroppers that do not communicate, or share observations with each other. In another example, the third computing device 109 may be part of a group of colluding eavesdroppers that combine their measurements to obtain less noisy measurements. However, since the first computing device 104 and the second computing device 108 compress the initial keys $u_1$, $u_2$ and apply a universal hash function to the compressed initial keys $q_1$, $q_2$, any difference between the distance determined by either the first computing device 104 or the second computing device 108 and the distance determined by the third computing device 109 is amplified. Thus, the third computing device 109 is inhibited from generating an encryption key that matches the final encryption keys $k_1$, $k_2$, even if the third computing device 109 is part of a group of other eavesdroppers.

Also, in some embodiments, the communication system 100 may utilize the distance between the first computing device 104 and the second computing device 108 in addition to additional random measurements. For example, some communication systems utilize measures of channel reciprocity between legitimate nodes to generate a secret encryption key. The communication system 100 may then use both channel reciprocity and a measured distance between legitimate nodes (i.e., computing devices 104, 108) to generate the final encryption keys. For example, the first computing device 104 and the second computing device 108 may generate a combination binary sequence generated based on a measured distance and measured channel reciprocity. The combination binary sequence may then be converted to an initial encryption key, similar to step 132 of FIG. 3. The compression and privacy amplification may then be implemented as described when the first computing device 104 and the second computing device 108 use only the measured distance to generate the final encryption keys.

Thus, the invention provides, among other things, a system for generating secret encryption keys based on a distance between two computing devices by applying a compression process and a privacy amplification process. Various features and advantages of the invention are set forth in the following claims.

What is claimed is:

1. A method of generating an encryption key for use in electronic communications, the method comprising:
    determining, by an electronic processor, a distance and angle between a first node and a second node, wherein the first node includes a first computing device and the second node includes a second computing device;
    generating, by the electronic processor, a first encryption key, the first encryption key being based on the distance and angle between the first node and the second node;
    compressing, by the electronic processor, the first encryption key to generate a compressed encryption key; and
    applying, by the electronic processor, a universal hash function to the compressed encryption key to generate a second encryption key;
    wherein the second encryption key is reduced in size from the first encryption key; and
    transmitting, with the electronic processor, an encrypted message from the first node to the second node using the second encryption key.

2. The method of claim 1, wherein determining a distance between the first node and the second node includes
    transmitting, by the electronic processor, a beacon to the second node;
    receiving, by the electronic processor, a response beacon from the second node; and
    determining the distance between the first node and the second node based on the response beacon from the second node.

3. A method of generating an encryption key for use in electronic communications, the method comprising
    transmitting, by an electronic processor of a first computing device, a beacon to a second computing device;
    receiving, by the electronic processor, a response beacon from the second computing device;
    determining, by the electronic processor, whether a third computing device is positioned such that the third computing device degrades the communication between the first computing device and the second computing device; and
    inhibiting, by the electronic processor, the transmission of the beacon to the second computing device when the electronic processor determines that the third computing device is positioned such that the third computing device degrades the communication between the first computing device and the second computing device;
    determining a distance and angle between the first computing device and the second computing device based on the response beacon from the second computing device;
    generating, by the electronic device, a first encryption key, the first encryption key being based on the distance and angle between the first computing device and the second computing device;
    compressing, by the electronic processor, a first encryption key to generate a compressed encryption key;
    applying, by the electronic processor, a universal hash function to the compressed encryption key to generate a second encryption key, wherein the second encryption key is reduced in size from the first encryption key; and
    transmitting, with the electronic processor, an encrypted message from the first computing device to the second computing device using the second encryption key.

4. The method of claim 1, wherein generating a first encryption key includes
    generating, by the electronic processor, quantized space coordinates for the first node based on the distance between the first node and the second node;
    generating, by the electronic processor, quantized space coordinates for the second node based on the distance between the first node and the second node; and
    generating, by the electronic processor, a digital sequence based on the quantized space coordinates for the first node and the quantized space coordinates for the second node;
    wherein the first encryption key is generated based on the digital sequence.

5. The method of claim 4, wherein the digital sequence is a binary sequence, and wherein a Gray encoder is used to generate the binary sequence.

6. The method of claim 4, wherein generating quantized space coordinates includes quantizing, by the electronic processor, a space occupied by the first node and the second node according to uniform two-dimensional space quantization.

7. The method of claim 4, wherein generating the digital sequence includes generating, by the electronic processor, the digital sequence based on a difference between the quantized space coordinates for the first node and the quantized space coordinates for the second node.

8. The method of claim 4, further comprising communicating, via a public channel, a specific number of bits to reconcile location information determined by the first node with location information determined by the second node, wherein the digital sequence is a first digital sequence generated by the first node, wherein the second node generates a second digital sequence, and wherein the specific number of bits communicated via the public channel is based on a mismatch rate between the first digital sequence and the second digital sequence.

9. The method of claim 8, wherein the first encryption key is based on the first digital sequence, the second digital sequence, and the specific number of bits communicated between the first node and the second node.

10. The method of claim 8, wherein a Cascade protocol is used to reconcile the location information between the first node and the second node.

11. The method of claim 1, further comprising determining, by the electronic processor, a parameter used by the universal hash function to generate the second encryption key; and communicating, by the electronic processor, the determined parameter to the second node over a public channel.

12. The method of claim 1, wherein determining a distance between the first node and the second node includes:
   transmitting, by the electronic processor, a plurality of beacons to the second node;
   receiving, by the electronic processor, a plurality of response beacons from the second node, each response beacon received in response to each of the plurality of beacons; and
   determining the distance and angle between the first node and the second node based on the plurality of response beacons from the second node.

13. A system used in generation of encryption keys for electronic communications, the system comprising
   a first node being a first computing device including a first electronic processor configured to
      determine a first distance and angle between the first node and a second node,
      generate a first encryption key, the first encryption key being based on the first distance and angle between the first node and the second node,
      compress the first encryption key to generate a compressed first encryption key,
      generate a second encryption key based on the compressed first encryption key, wherein the second encryption key is reduced in size from the first encryption key, and
      transmit a message to the second node encrypted with the second encryption key; and
   a second node being a second computing device including a second electronic processor configured to
      determine a second distance and angle between the second node and the first node,
      generate a third encryption key based on the second distance and angle between the second node and the first node,
      compress the third encryption key to generate a compressed third encryption key,
      generate a fourth encryption key based on the compressed third encryption key, wherein the fourth encryption key is reduced in size from the third encryption key, and
      receive the message from the first node, and
      decrypt the message from the first node using the fourth encryption key.

14. The system of claim 13, wherein the first electronic processor is configured to
   transmit a beacon to the second electronic processor,
   receive a response beacon from the second electronic processor, and
   determine the distance between the first node and the second node based on the response beacon from the second electronic processor; and
   wherein the second electronic processor is configured to receive the beacon from the first electronic processor,
   transmit the response beacon to the first electronic processor upon receiving the beacon from the first processor, and
   determine the distance between the first node and the second node based on the beacon from the first electronic processor.

15. The system of claim 13, wherein the first electronic processor is configured to determine whether a third node is positioned such that the third node degrades the communication between the first node and the second node, and
inhibit the transmission of the beacon to the second node when the first electronic processor determines that the third node is positioned such that the third node degrades the communication between the first node and the second node.

16. The system of claim 13, wherein the first electronic processor is configured to
   generate a first set of quantized space coordinates for the first node based on the distance between the first node and the second node determined by the first electronic processor,
   generate a first set of quantized space coordinates for the second node based on the distance between the first node and the second node determined by the first electronic processor, and
   generate a first digital sequence based on the first set of quantized space coordinates for the first node and the first set of quantized space coordinates for the second node,
   wherein the first encryption key is based on the first digital sequence; and
   wherein the second electronic processor is configured to
   generate a second set of quantized space coordinates for the first node based on the distance between the first node and the second node determined by the second electronic processor,
   generate a second set of quantized space coordinates for the second node based on the distance between the first node and the second node determined by the second electronic processor, and
   generate a second digital sequence based on the second set of quantized space coordinates for the first node and the second set of quantized space coordinates for the second node,
   wherein the third encryption key is based on the second digital sequence.

17. The system of claim 16, wherein the first digital sequence is a binary sequence generated by a first gray encoder, and wherein the second digital sequence is also a binary sequences generated by a second gray encoder.

18. The system of claim 16, wherein the first set of quantized space coordinates for the first node, the second set of quantized coordinates for the first node, the first set of quantized space coordinates for the second node, and the second set of quantized space coordinates for the second node are based on uniform two-dimensional space quantization.

19. The system of claim 16, wherein the first electronic processor and the second electronic processor compare the first digital sequence and the second digital sequence, and wherein the first electronic processor and the second electronic processor communicate, via a public channel, a specific number of bits to reconcile the first digital sequence and the second digital sequence, and wherein the first encryption key and the third encryption key are also based on the specific number of bits.

20. The system of claim 16, wherein the first electronic processor and the second electronic processor communicate using a Cascade protocol to reconcile the first digital sequence and the second digital sequence.

21. The system of claim 13, wherein the first electronic processor is configured to determine a parameter used by the universal hash function to generate the second encryption key and the fourth encryption key, and communicate the determined parameter to the second node over a public channel.

* * * * *